US010803605B2

(12) United States Patent
Okubo (10) Patent No.: US 10,803,605 B2
(45) Date of Patent: Oct. 13, 2020

(54) VEHICLE EXTERIOR ENVIRONMENT RECOGNITION APPARATUS

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 91 days.

(21) Appl. No.: 16/191,125

(22) Filed: Nov. 14, 2018

(65) Prior Publication Data

US 2019/0197704 A1    Jun. 27, 2019

(30) Foreign Application Priority Data

Dec. 25, 2017    (JP) ................................. 2017-248483

(51) Int. Cl.
*G06K 9/60*    (2006.01)
*G06T 7/246*    (2017.01)
*G06K 9/00*    (2006.01)

(52) U.S. Cl.
CPC .......... *G06T 7/251* (2017.01); *G06K 9/00791* (2013.01); *G06K 9/00798* (2013.01);
(Continued)

(58) Field of Classification Search
None
See application file for complete search history.

(56) References Cited

U.S. PATENT DOCUMENTS 5,904,725 A * 5/1999 Iisaka ........................ G01S 5/16
701/523
2014/0071240 A1  3/2014 Chen et al.
(Continued)

FOREIGN PATENT DOCUMENTS

CN    103837139 A    6/2014
CN    104166834 A    11/2014
(Continued)

OTHER PUBLICATIONS

Japanese Notice of Reasons for Refusal issued in corresponding Japanese Patent Application No. 2017-248483, dated Nov. 26, 2019, with English translation.

*Primary Examiner* — Suhail Khan
(74) *Attorney, Agent, or Firm* — McDermott Will & Emery LLP (57) ABSTRACT

A vehicle exterior environment recognition apparatus includes a first road surface identifier and a second road surface identifier. The first road surface identifier identifies a first road surface region of a road surface in an image and generates a first road surface model by plotting, at respective vertical positions, representative distances of horizontal arrays of blocks in the first road surface region. The second road surface identifier identifies a second road surface region in the image and generates a second road surface model by plotting, at respective vertical positions, representative distances of horizontal arrays of blocks in the second road surface region. The second road surface region is a region of the road surface that is farther from a vehicle than the first road surface region is, and has a horizontal length greater than a horizontal length of the first road surface region in a three-dimensional space.

3 Claims, 9 Drawing Sheets

(52) U.S. Cl.
CPC ............... *G06K 9/00825* (2013.01); *G06T 2207/30236* (2013.01); *G06T 2207/30256* (2013.01)

(56) References Cited

U.S. PATENT DOCUMENTS

| | | |
|---|---|---|
| 2015/0227800 A1 | 8/2015 | Takemae |
| 2016/0305785 A1 | 10/2016 | Nishijima et al. |
| 2017/0124725 A1 | 5/2017 | Sumiyoshi |
| 2018/0165529 A1* | 6/2018 | Ishigami ............ G06K 9/00805 |

FOREIGN PATENT DOCUMENTS

| | | |
|---|---|---|
| EP | 2767927 A2 | 8/2014 |
| JP | 3349060 B2 | 11/2002 |
| JP | 2011-128844 A | 6/2011 |
| JP | 2014-225220 A | 12/2014 |
| JP | 2015-149028 A | 8/2015 |
| JP | 2016-062356 A | 4/2016 |
| JP | 2016-206776 A | 12/2016 |
| JP | 2017-083326 A | 5/2017 |
| JP | 2017-207874 A | 11/2017 |

\* cited by examiner

VEHICLE EXTERIOR ENVIRONMENT RECOGNITION APPARATUS

CROSS-REFERENCE TO RELATED APPLICATIONS

The present application claims priority from Japanese Patent Application No. 2017-248483 filed on Dec. 25, 2017, the entire contents of which are hereby incorporated by reference.

BACKGROUND

The technology relates to a vehicle exterior environment recognition apparatus that identifies a specific object present in a traveling direction of an own vehicle.

A technique has been proposed which detects a three-dimensional object, such as a preceding vehicle located ahead of an own vehicle, to perform a control that avoids contact with the preceding vehicle (i.e., a contact avoidance control) or to perform a control that keeps a predetermined inter-vehicular distance between the own vehicle and the preceding vehicle (i.e., a cruise control). For example, reference is made to Japanese Patent No. 3349060.

SUMMARY

An aspect of the technology provides a vehicle exterior environment recognition apparatus that recognizes an environment outside a vehicle. The apparatus includes: a first road surface identifier configured to identify a first road surface region of a road surface in an image, and generate a first road surface model by plotting, at respective vertical positions, representative distances of horizontal arrays of blocks in the first road surface region; and a second road surface identifier configured to identify a second road surface region in the image, and generate a second road surface model by plotting, at respective vertical positions, representative distances of horizontal arrays of blocks in the second road surface region. The second road surface region is a region of the road surface that is farther from the vehicle than the first road surface region is, and has a horizontal length greater than a horizontal length of the first road surface region in a three-dimensional space.

An aspect of the technology provides a vehicle exterior environment recognition apparatus that recognizes an environment outside a vehicle. The vehicle exterior environment recognition apparatus includes circuitry configured to identify a first road surface region of a road surface in an image, and generate a first road surface model by plotting, at respective vertical positions, representative distances of horizontal arrays of blocks in the first road surface region, and identify a second road surface region in the image, and generate a second road surface model by plotting, at respective vertical positions, representative distances of horizontal arrays of blocks in the second road surface region. The second road surface region is a region of the road surface that is farther from the vehicle than the first road surface region is and having a horizontal length greater than a horizontal length of the first road surface region in a three-dimensional space.

BRIEF DESCRIPTION OF THE DRAWINGS

The accompanying drawings are included to provide a further understanding of the technology and are incorporated in and constitute a part of this specification. The drawings illustrate example implementations and, together with the specification, serve to explain the principles of the technology.

DETAILED DESCRIPTION

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

Non-limiting examples of a three-dimensional object present in a traveling direction of an own vehicle may include a preceding vehicle traveling in the same direction as the own vehicle and a pedestrian moving across the traveling path of the own vehicle. One necessary condition for extraction of such a three-dimensional object is that the three-dimensional object has a height extending vertically upward from a road surface.

The extraction of such a three-dimensional object, however, is performed based on an assumption that the road surface has been properly identified. Improper identification of the road surface may possibly lead to improper determination of a road with a gradient to be a three-dimensional object, or a failure in extracting a three-dimensional object actually present. In particular, identification of a road surface distant from the own vehicle has been difficult because of low reliability of an image or parallax of the distant road surface.

It is desirable to provide a vehicle exterior environment recognition apparatus that makes it possible to properly identify a road surface.

[Vehicle Exterior Environment Recognition System 100]

Figure 1:
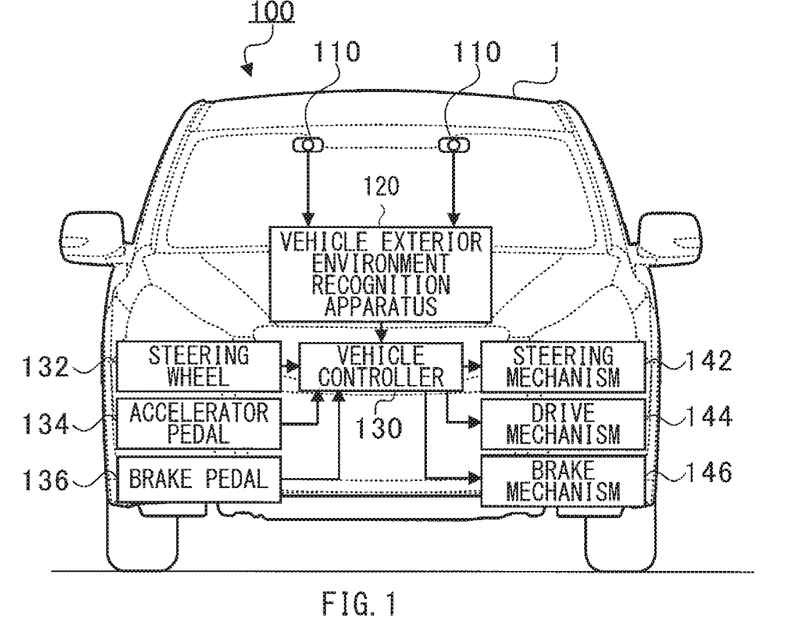
FIG. 1 is a block diagram illustrating an example relation of connection in a vehicle exterior environment recognition system according to one implementation of the technology.

FIG. 1 is a block diagram illustrating an example relation of connection in a vehicle exterior environment recognition system 100 according to an example implementation of the technology. The vehicle exterior environment recognition system 100 may include at least one image-capturing unit 110, a vehicle exterior environment recognition apparatus 120, and a vehicle controller (e.g., an engine control unit (ECU)) 130. The number of the image-capturing units 110 may be, for example but not limited to, two, in the example implementation of the technology.

The image-capturing units 110 each may include an imaging device such as, but not limited to, a charge-coupled device (CCD) and a complementary metal-oxide semiconductor (CMOS). The image-capturing units 110 each may capture an image of a vehicle exterior environment ahead of the own vehicle 1, and generate a luminance image (e.g., color image or monochrome image) including at least luminance information. The two image-capturing units 110 may be disposed separated away from each other in a substantially horizontal direction. The two image-capturing units 110 may be disposed so that their respective optical axes are to be substantially parallel to each other along a traveling direction of the own vehicle 1. The image-capturing units 110 may continuously generate a luminance image for each frame of, for example but not limited to, 1/60 second (at a frame rate of 60 fps). The luminance image may be obtained as a result of the image capturing performed on a detection region ahead of the own vehicle 1. Non-limiting examples of a three-dimensional object to be recognized with the image-capturing units 110 may include a three-dimensional object independently present, as well as an object identifiable as a part of the three-dimensional object. Non-limiting examples of the independently-present three-dimensional object may include a bicycle, a pedestrian, a vehicle, a traffic light, a road sign, a guardrail, and a building. Non-limiting examples of the object identifiable as a part of the three-dimensional object may include a wheel of a bicycle.

The vehicle exterior environment recognition apparatus 120 may receive the respective luminance images from the two image-capturing units 110, and perform a so-called pattern matching between the luminance images. The pattern matching may involve extracting any block from one of the luminance images and searching the other luminance image for a block corresponding to the extracted block. The block may be, for example but not limited to, an array of four horizontal pixels and four vertical pixels. Through the pattern matching, the vehicle exterior environment recognition apparatus 120 may derive parallax information indicating a parallax and a position of any block in the luminance image. As used herein, the term "horizontal" refers to a lateral direction of a screen of the captured image, and the term "vertical" refers to a longitudinal direction of the screen of the captured image. In the example pattern matching, luminance (Y) may be compared per block between the two luminance images. Non-limiting examples of a scheme for the comparison may include SAD (Sum of Absolute Difference) that obtains luminance differences, SSID (Sum of Squared Intensity Difference) that uses the squared differences, and ZNCC (Zero-mean Normalized Cross Correlation) that obtains similarity of variance obtained by subtracting an average luminance value from a luminance value of each pixel. The vehicle exterior environment recognition apparatus 120 may perform the parallax deriving process, performed on a block basis, for all blocks in the detection region. The detection region may be, for example but not limited to, an array of 600 horizontal pixels by 200 vertical pixels. In this example implementation, each block may include the array of four horizontal pixels by four vertical pixels; however, any number of pixels may be included in each block.

The vehicle exterior environment recognition apparatus 120 may derive the parallax per block, i.e., on a detection resolution basis. However, the vehicle exterior environment recognition apparatus 120 may have difficulties in recognizing which part of the three-dimensional object the block belongs to and which type the three-dimensional object is. Hence, the parallax information may be derived independently on the detection resolution basis (e.g., on the block basis) with respect to the detection region, not on a three-dimensional object basis. An image in association with the derived parallax information is hereinafter referred to as a "distance image", for discrimination from the luminance image describe above.

Figure 2A:
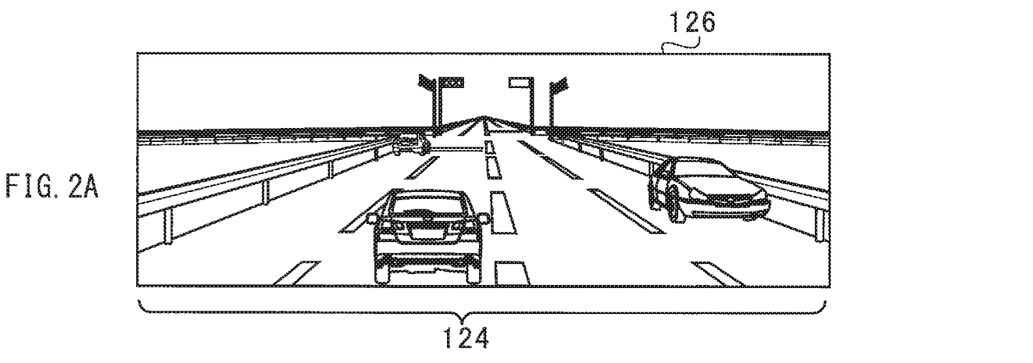
FIG. 2A is a diagram illustrating an example luminance image.
Figure 2B:
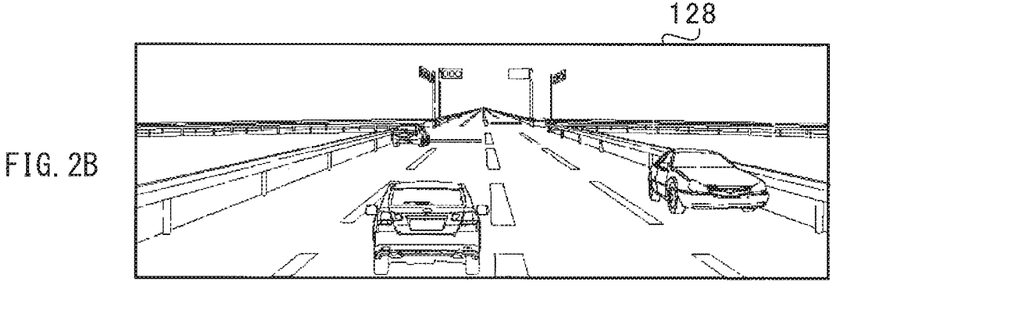
FIG. 2B is a diagram illustrating an example distance image.

FIG. 2A illustrates a non-limiting example of the luminance image (luminance image 126), and FIG. 2B illustrates a non-limiting example of the distance image (distance image 128). For example, the two image-capturing units 110 may generate the respective luminance images 126 of a detection region 124, as illustrated in FIG. 2A. Note that only one of the luminance images 126 is schematically illustrated in FIG. 2 for easier understanding of the example implementation of the technology. The vehicle exterior environment recognition apparatus 120 may obtain a parallax per block from the luminance images 126 and generate the distance image 128 illustrated in FIG. 2B. Each block in the distance image 128 may be associated with the corresponding parallax. For convenience of illustration, the blocks in association with the respective parallaxes are each represented by a solid dot, in FIG. 2B.

The vehicle exterior environment recognition apparatus 120 may identify a road surface using position information in a three-dimensional real space. The three-dimensional position information may include a luminance value (e.g., color value) calculated from the luminance image 126 and a relative distance from the own vehicle 1 calculated from the distance image 128. The vehicle exterior environment recognition apparatus 120 may then perform grouping of blocks that are located on the identified road surface. The blocks that are equal to each other in color values and close to each other in the three-dimensional position information may be grouped into a single three-dimensional object. The vehicle exterior environment recognition apparatus 120 may then identify to which object (e.g., the preceding vehicle or bicycle) the three-dimensional object in the detection region ahead of the own vehicle 1 corresponds. After the identification of the three-dimensional object, the vehicle exterior environment recognition apparatus 120 may control the own vehicle 1 to avoid contact with the three-dimensional object (i.e., a contact avoidance control) or control the own vehicle 1 to keep a predetermined inter-vehicular distance from the preceding vehicle (i.e., a cruise control) for safety. The relative distance may be determined by converting the information on parallax per block of the distance image 128 into the three-dimensional position information by means of a so-called stereo method. The stereo method may derive, from the parallax of any part of the three-dimensional object, the relative distance between the part of the three-dimensional object and the image-capturing units 110 by means of a triangulation method.

The vehicle controller 130 may control the own vehicle 1 by receiving information on an operation input of the driver through a steering wheel 132, an accelerator pedal 134, and a brake pedal 136 and sending the information to a steering mechanism 142, a drive mechanism 144, and a brake mechanism 146. The vehicle controller 130 may also control the steering mechanism 142, the drive mechanism 144, and the brake mechanism 146, in accordance with instructions from the vehicle exterior environment recognition apparatus 120.

As described above, the vehicle exterior environment recognition system 100 may perform the grouping of blocks that are equal to each other in color values and close to each other in the three-dimensional position information, into a single three-dimensional object, on condition that the three-dimensional object has a height extending vertically upward from the road surface. For proper extraction of the three-dimensional object, the road surface should be properly identified. Improper identification of the road surface may possibly lead to improper determination of a road with a gradient to be a three-dimensional object having a height extending vertically upward from the road surface, or erroneous identification of a three-dimensional object actually located on a downward slope as being located vertically below the road surface, for example. In particular, identification of a road surface distant from the own vehicle has been difficult because of low reliability of an image or parallax of the distant road surface. Accordingly, an object of at least one implementation of the technology is to provide a vehicle exterior environment recognition apparatus that makes it possible to properly identify the road surface.

In the following, a description is given in detail of a configuration of the vehicle exterior environment recognition apparatus 120 that achieves the example object of at least one implementation of the technology. A description is given here in detail of an example process of identifying the road surface in the detection region ahead of the own vehicle 1, which may be one feature of this example implementation. Note that a configuration less related to features of the implementation will not be described in detail.

[Vehicle Exterior Environment Recognition Apparatus 120]

Figure 3:
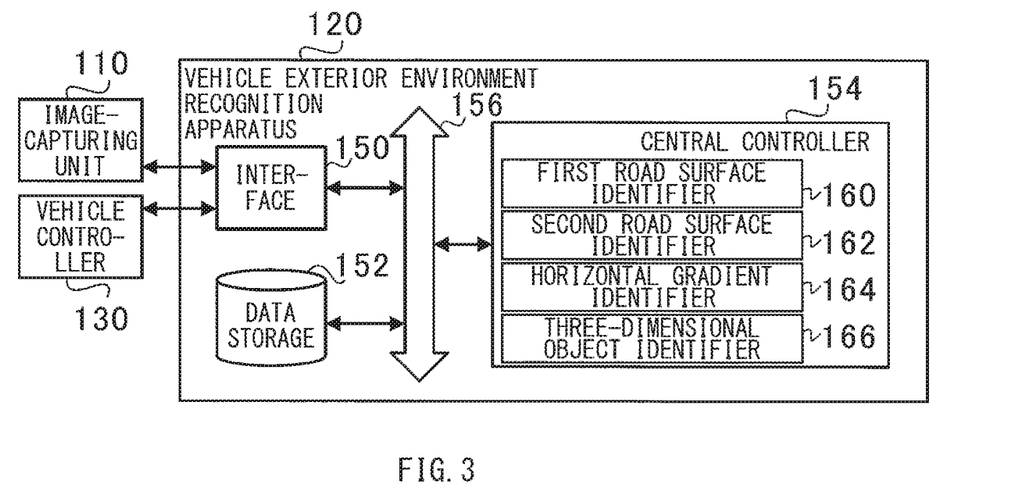
FIG. 3 is a block diagram illustrating a schematic configuration of a vehicle exterior environment recognition apparatus according to one implementation of the technology.

FIG. 3 is a block diagram illustrating a schematic configuration of the vehicle exterior environment recognition apparatus 120 according to an example implementation of the technology. As illustrated in FIG. 3, the vehicle exterior environment recognition apparatus 120 may include an interface (I/F) 150, a data storage 152, and a central controller 154.

The interface 150 may exchange information interactively between devices including, without limitation, the image-capturing unit 110 and the vehicle controller 130. The data storage 152 may include a random access memory (RAM), a flash memory, a hard disk drive (HDD), or any other suitable storage device. The data storage 152 may store various pieces of information necessary for processes to be carried out by the components described hereinafter.

The central controller 154 may include a semiconductor integrated circuit, and control devices including, without limitation, the interface 150 and the data storage 152 through a system bus 156. The semiconductor integrated circuit may have devices such as, but not limited to, a central processing circuit (CPU), a read only memory (ROM) in which programs, etc., are stored, and a random access memory (RAM) serving as a work area. In this example implementation, the central controller 154 may also serve as a a first road surface identifier 160, a second road surface identifier 162, a horizontal gradient identifier 164, and a three-dimensional object identifier 166. In the following, a vehicle exterior environment recognition procedure that identifies a road surface is described in detail as one feature of this example implementation with reference to operation of each of the components of the central controller 154.

[Vehicle Exterior Environment Recognition Procedure]

Figure 4:
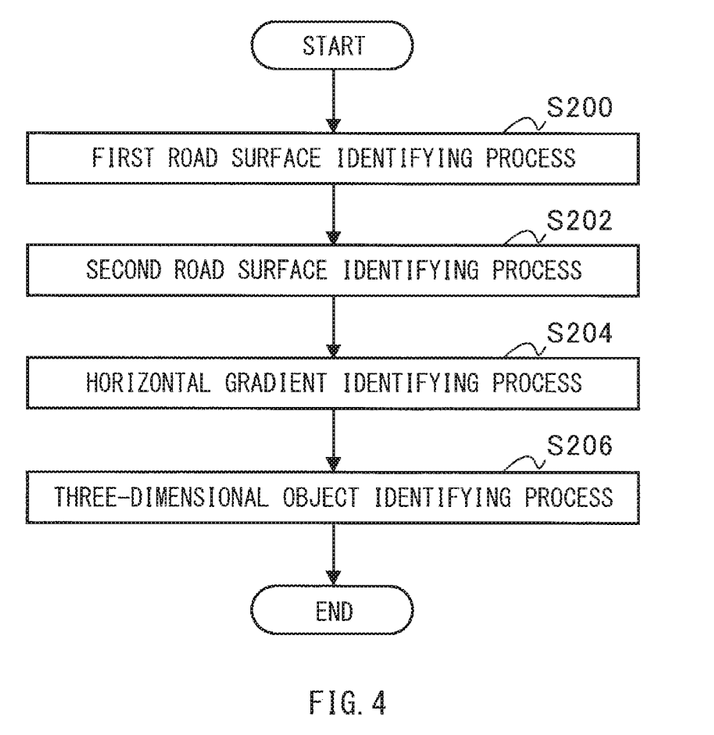
FIG. 4 is a flowchart illustrating an example vehicle exterior environment recognition procedure.

FIG. 4 is a flowchart of a non-limiting example of the vehicle exterior environment recognition procedure. In the vehicle exterior environment recognition procedure, the first road surface identifier 160 performs a first road surface identifying process (S200) that involves identifying a first road surface region in the road surface in the image and generating a first road surface model. Thereafter, the second road surface identifier 162 performs a second road surface identifying process (S202) that involves identifying a second road surface region in the road surface in the image and generating a second road surface model. The second road surface region is located farther from the own vehicle 1 than the first road surface region is. Thereafter, the horizontal gradient identifier 164 performs a horizontal gradient identifying process (S204) that involves identifying a gradient extending in the horizontal direction on the basis of relative distances of respective horizontal arrays of blocks in the first and second road surface regions. Thereafter, the three-dimensional object identifier 166 may perform a three-dimensional object identifying process (S206) that involves identifying a three-dimensional object in the image on the basis of at least the first road surface model and the second road surface model.

[First Road Surface Identifying Process S200]

The first road surface identifying process (S200) according to an example implementation of the technology will now be described in detail with reference to FIGS. 5A and 5B. First, the first road surface identifier 160 identifies a first road surface region of the road surface in the luminance image 126 or the distance image 128. The first road surface region is located closer to the own vehicle 1 than the remaining region of the road surface is.

One possible scheme to identify the first road surface region may involve generating a curve line that extends in front of the own vehicle 1 and indicates a future traveling path of the own vehicle 1, and identifying the first road surface region on the basis of the curve line. The future traveling path may be predicted on the basis of a current steering angle, a current turning angle rate (i.e., yaw rate), and a current speed of the own vehicle 1. For example, a region extending within a range of 2.5 meters from the curve line in either side of the road surface along the horizontal direction may be identified as the first road surface region.

The curve line indicating the predicted traveling path, however, may possibly be readily varied depending on a steering operation of a driver, and may possibly be largely deviated from an actual traveling path of the own vehicle 1. This may possibly hinder proper identification of the first road surface region extending over a long distance.

To address such a concern, an example implementation of the technology may identify the first road surface region on the basis of right and left lane lines (e.g., white lines) on a lane on which the own vehicle 1 is traveling. Note that the first road surface region may be identified on the basis of any other factor in addition to these lane lines. In an alternative implementation of the technology, the first road surface region may be identified on the basis of the lane lines and also the predicted traveling path. Such complementary identification improves accuracy in identifying the first road surface region.

Figure 5A:
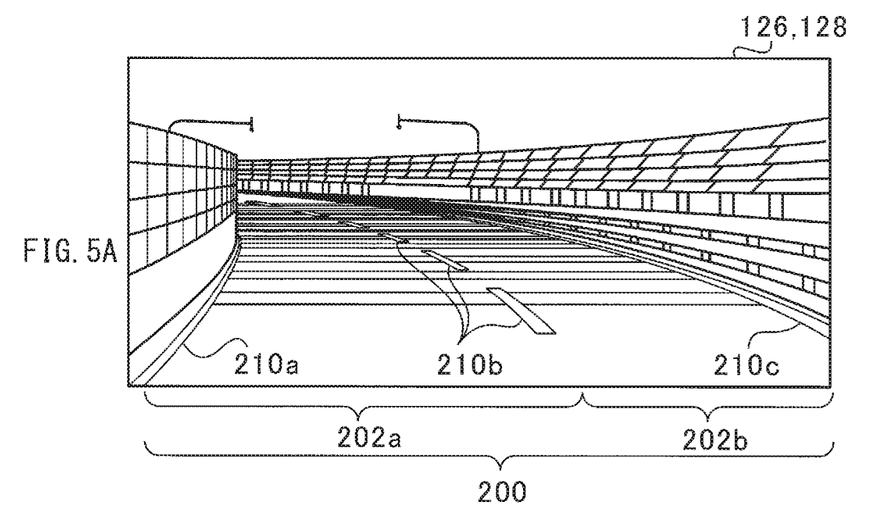
FIG. 5A is a diagram illustrating an example step in a first road surface identifying process.
Figure 5B:
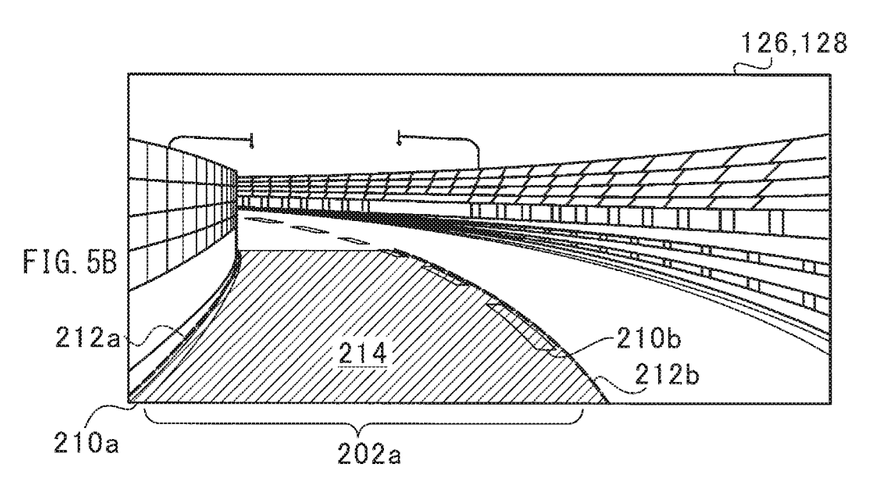
FIG. 5B is a diagram illustrating an example step, following the step of FIG. 5A, in the first road surface identifying process.

FIGS. 5A and 5B illustrate an example of the first road surface region identifying process (S200). The road may be provided lane lines for smooth traveling of a vehicle. In an example implementation illustrated in FIG. 5A, the road 200 in the luminance image 126 may be provided with three lane lines (i.e., a left lane line 210*a*, a middle lane line 210*b*, and a right lane line 210*c*). The left lane line 210*a* may be provided on a left side of the road 200. The middle lane line 210*b* may be provided in the middle of the road 200 along the horizontal direction. The left lane 210*c* may be provided on a right side of the road 200. These lane lines 210*a* to 210*c* may divide the road 200 into two lanes 202*a* and 202*b*. The lane 202*a* may be defined between the left lane line 210*a* and the middle lane line 210*b*, and the lane 202*b* may be defined between the right lane line 210*c* and the middle lane line 210*b*.

The first road surface identifier 160 may set an imaginary left limit line 212*a*, as illustrated by a dashed line in FIG. 5B. The imaginary left limit line 212*a* may be shifted leftward by a predetermined distance (e.g., 10 cm) from the left lane line 210*a*, which is located on a leftmost side of the lane 202*a* on which the own vehicle 1 is traveling. Likewise, the first road surface identifier 160 may set an imaginary right limit line 212*b*, as illustrated by another dashed line in FIG. 5B. The imaginary right limit line 212*b* may be shifted rightward by a predetermined distance (e.g., 10 cm) from the middle lane line 210*b*, which is located on a rightmost side of the lane 202*a* on which the own vehicle 1 is traveling. Thereafter, the first road surface identifier 160 sets a region extending rightward from the left limit line 212*a* and leftward from the right limit line 212*b* to be the first road surface region 214. In other words, the first road surface identifier 160 sets a region extending between the left limit line 212*a* and the right limit line 212*b* along the horizontal direction (i.e., a hatched region in FIG. 5B) to be the first road surface region 214.

Thereafter, the first road surface identifier 160 may extract, from the first road surface region 214 in the distance image 128, all of the blocks in association with the respective relative distances (i.e., all of the blocks from which relative distances are respectively calculated through the pattern matching). The first road surface identifier 160 generates a first road surface model on the basis of the extracted blocks. The generation of the first road surface model according to an example implementation of the technology will now be described.

Figure 6:
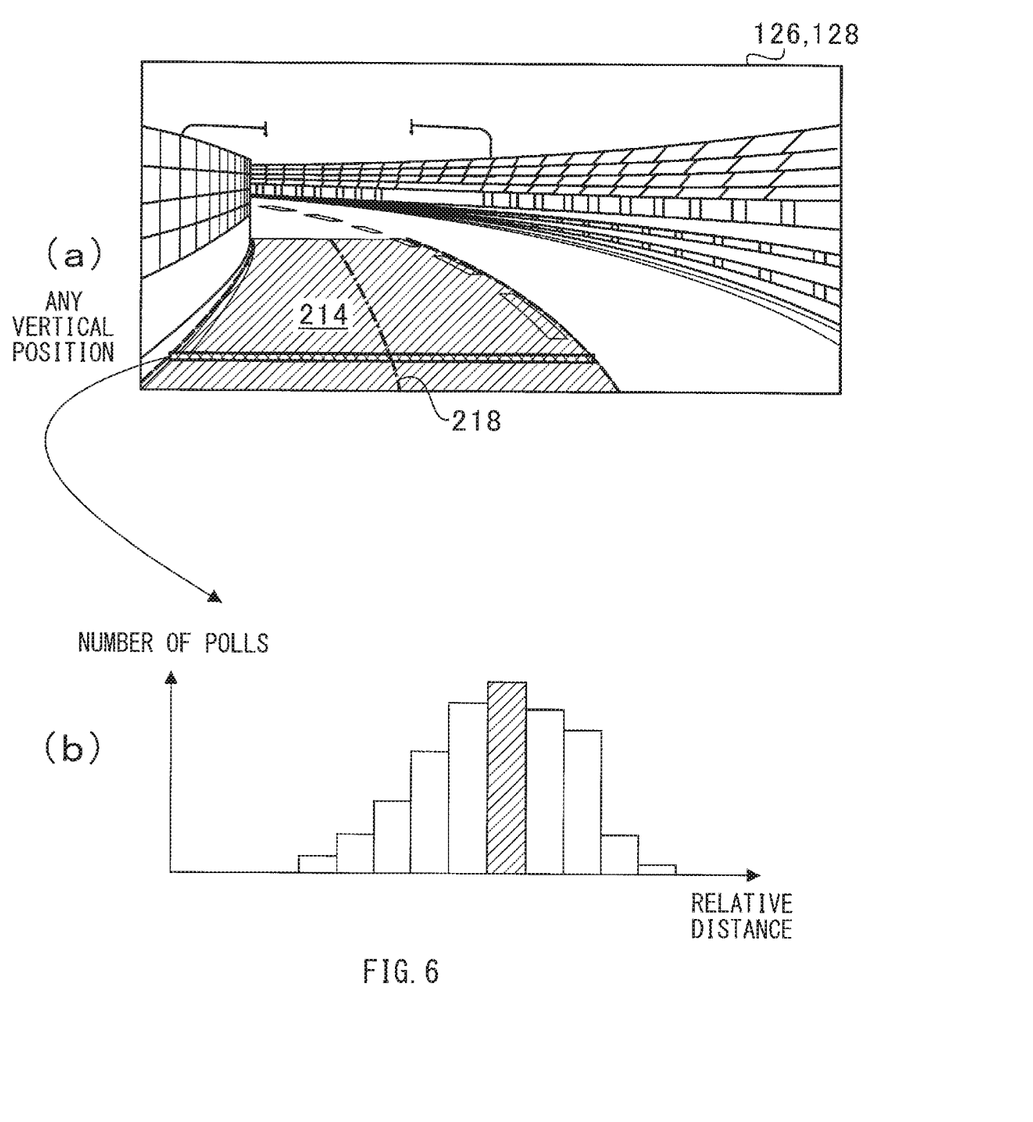
FIG. 6 is a diagram illustrating an example of a histogram.
Figure 7A:
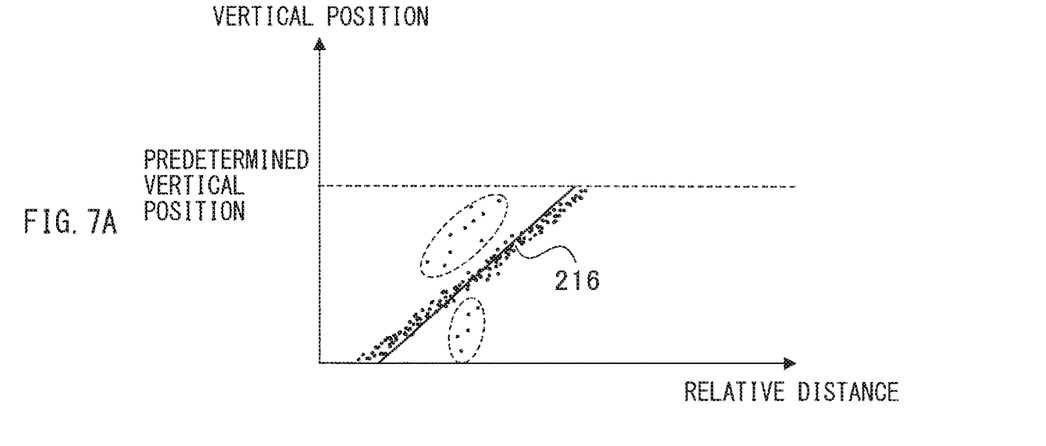
FIG. 7A is a diagram illustrating an example of a first road surface model.
Figure 7B:
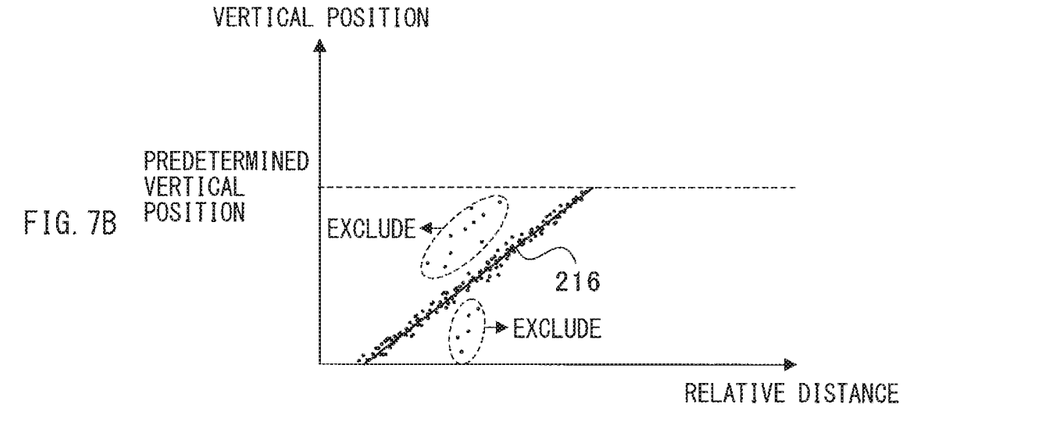
FIG. 7B is a diagram illustrating an example of the first road surface model.
Figure 7C:
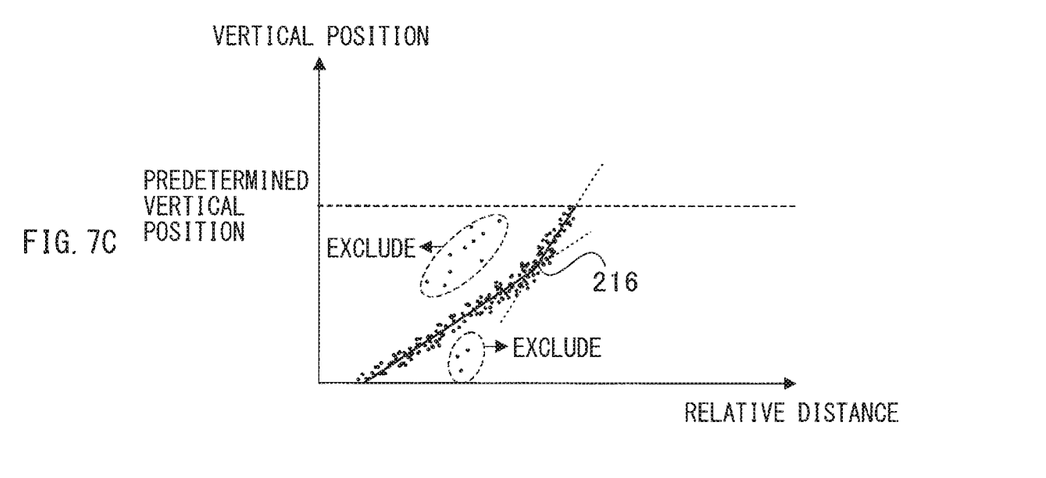
FIG. 7C is a diagram illustrating an example of the first road surface model.

FIG. 6 illustrates a non-limiting example of a histogram according to an example implementation of the technology, and FIG. 7 illustrates a non-limiting example of the first road surface model. First, the first road surface identifier 160 may generate a histogram of the relative distances of any horizontal array of blocks along the horizontal direction in the first road surface region 214. For example, the first road surface identifier 160 may poll the relative distances of blocks located at the same vertical position as any of the blocks in the first road surface region 214. In other words, the first road surface identifier 160 may poll the relative distances of all blocks in any horizontal array (e.g., a cross-hatched array in (a) of FIG. 6) in the first road surface region 214. On the basis of the polled relative distances, a histogram regarding any vertical position may be generated, as illustrated in (b) of FIG. 6.

A hatched bar in the histogram in (b) of FIG. 6 indicates a relative distance having a maximum number of polls. The first road surface identifier 160 may set the relative distance indicated by the hatched bar to be a representative distance of the vertical position. The first road surface identifier 160 may repeat such a process for another vertical position while changing a vertical position of interest in the first road surface region 214, to derive the representative distances of respective vertical positions in the first road surface region 214.

The first road surface identifier 160 generates the first road surface model on the basis of the representative distances. For example, the first road surface model may be represented by a relation between a vertical axis indicating the vertical position in the distance image 128 and a horizontal axis indicating the relative distance in the distance image 128. In this example implementation, the first road surface identifier 160 plots, at the respective vertical positions, the representative distances of the respective vertical positions (i.e., the representative distances of the respective horizontal arrays of blocks) to generate point groups illustrated in FIG. 7A. From the point groups, the first road surface identifier 160 may generate an approximate straight line, which is illustrated by a solid line in FIG. 7A, by means of a least squares method, for example. The first road surface identifier 160 sets the approximate straight line to be a first road surface model 216. The first road surface model 216 helps to identify a varying feature, such as gradient, of the road surface. As used herein, the term "varying feature" refers to how the road surface varies. In this example implementation, the first road surface model 216 may be derived in the form of the approximate straight line for the purpose of illustration; however, the first road surface model 216 may be derived in the form of a multi-dimensional approximated curve, in an alternative implementation of the technology.

The approximate straight line generated simply by means of the least squares method, however, may possibly include noise representative distances. The noise representative distances may include error representative distances that are obtained by erroneous pattern matching in the first road surface region 214, for example. Inclusion of such noise representative distances, which should be practically excluded, may possibly cause deviation of the resultant approximate straight line from an appropriate position or inclination, as illustrated in FIG. 7A. This deviation may possibly lead to improper determination of a road with a gradient to be a three-dimensional object, or a failure in extracting a three-dimensional object actually present.

To address such a concern, an example implementation of the technology may perform the Hough transform which detects a straight line in an image. Through the Hough transform, only a point group of representative distances that form a common straight line may be remained. Optionally, a point group of representative distances that form no common straight line but form straight lines parallel to and close to each other (i.e., straight lines apart from each other by a distance within a predetermined range) may be remained. The other point groups of representative distances (e.g., point groups each surrounded by a dashed line in FIG. 7A) may be excluded as the noise representative distances. The first road surface identifier 160 may perform the least squares method only on the remaining point group of representative distances to derive an approximate straight line from the point group. Through these processes, the first road surface model 216 may be generated in the form of the appropriate approximate straight line on the basis of the proper representative distances, as illustrated in FIG. 7B. Since the Hough transform is a known technique which derives a common straight line passing through a plurality of points, the description thereof is not described in detail herein.

In this example implementation, the varying feature of the road surface may be represented in the form of the approximate straight line. The road in the detection region, however, does not necessarily vary in the same fashion. For example, the road in the detection region may have a steep inclination, in some cases. In such cases, the Hough transform may possibly exclude most of representative distances corresponding to a region following the steep inclination, as the noise representative distances.

To address such a concern, an example implementation of the technology may derive another approximate straight line from the point group of the representative distances excluded by the Hough transform, in a case where the number of the representative distances excluded by the Hough transform is equal to or greater than a predetermined number and have continuity to each other. It is indisputable that noise representative distances may be excluded also in the generation of the other approximate straight line. Through these processes, the first road surface model 216 may be generated in the form of the two approximate straight lines continuous to each other, as illustrated in FIG. 7C.

Alternatively, the two approximate straight lines derived through the processes described above may intersect with each other at a predetermined angle, or may be coupled to each other with a transition curve with a predetermined radius. Additionally, although the two approximate straight lines may be generated in the foregoing implementation, three or more approximate straight lines may be generated for a road with lots of variations.

With reference to FIG. 7B, for example, the first road surface model 216 generated through these processes demonstrates that the relative distance decreases (i.e., the parallax increases) as the vertical position shifts downward in the first road surface region 214, and that the relative distance increases (i.e., the parallax decreases) as the vertical position shifts upward in the first road surface region 214.

Thereafter, the first road surface identifier 160 may determine a middle line 218 vertically extending in the middle of the first road surface region 214 along the horizontal direction. For example, the first road surface identifier 160 may specify a central block from blocks located at the same vertical position as any of the blocks in the first road surface region 214. In other words, the first road surface identifier 160 may specify a central block of any horizontal array of blocks (e.g., cross-hatched array of blocks in (a) of FIG. 6) in the first road surface region 214. The first road surface identifier 160 may repeat such a process for another vertical position while changing a vertical position of interest in the first road surface region 214, to determine central blocks of the respective vertical positions in the first road surface region 214. A line connecting these central blocks may be derived as the middle line 218.

As described above, some of the blocks in the first road surface region 214 may possibly include the noise representative distances. These noise-containing blocks, which should be practically excluded, may possibly cause deviation of the middle line 218 from an appropriate position or inclination. To address such a concern, an example implementation of the technology may determine the central blocks and the middle line 218 after removing the noise-containing blocks that are excluded by the Hough transform described above.

[Second Road Surface Identifying Process S202]

The first road surface identifying process S200 may generate the first road surface model 216 and determine the middle line 218 of the region of the road surface that is relatively closer to the own vehicle 1 than the remaining region of the road surface is. However, the first road surface identifying process 200, which merely involves extracting the relative distances from the region extending between the left limit line 212*a* and the right limit line 212*b* along the horizontal direction, has difficulty in properly identifying a region of the road surface that is farther from the own vehicle 1 than the first road surface region 214 is, because of low reliability of the image or parallax of the distant road surface. Accordingly, the first road surface model 216 is able to cover the vertical positions only up to a predetermined vertical position indicated by a dashed line in FIG. 7B.

To address such a concern, in an example implementation of the technology, the second road surface identifier 162 identifies a second road surface region that is farther from the own vehicle 1 than the first road surface region 214 is, in the luminance image 126 or the distance image 128, using a different logic from the first road surface identifier 160.

Figure 8A:
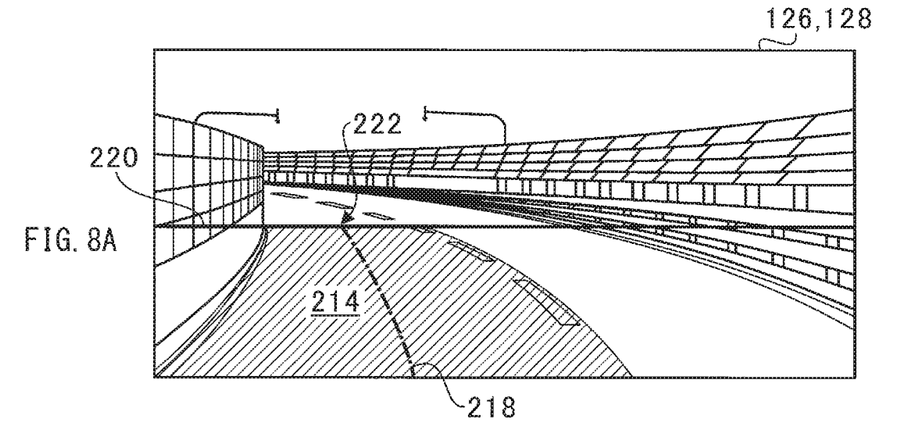
FIG. 8A is a diagram illustrating an example step in a second road surface identifying process.
Figure 8B:
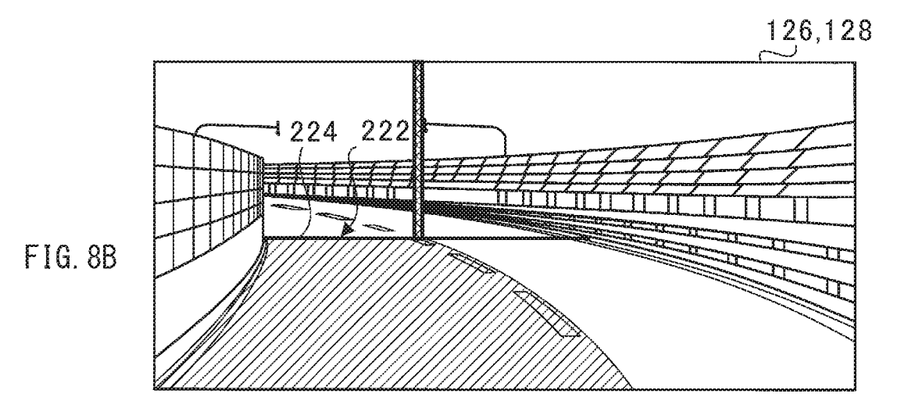
FIG. 8B is a diagram illustrating an example step, following the step of FIG. 8A, in the second road surface identifying process.
Figure 8C:
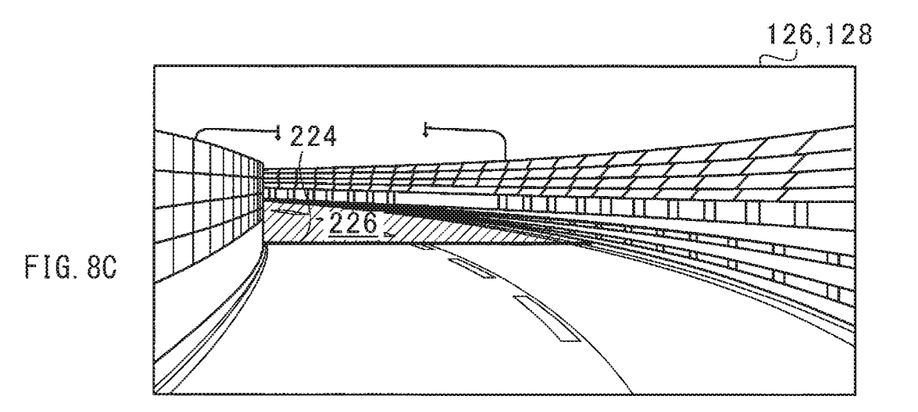
FIG. 8C is a diagram illustrating an example step, following the step of FIG. 8B, in the second road surface identifying process.

FIGS. 8A to 8C each illustrate a non-limiting example process of identifying the second road surface region. Through the first road surface identifying process S200, the first road surface model 216 and the middle line 218 may be generated from the region of the road surface that is relatively closer to the own vehicle 1 than the remaining region of the road surface is. It should be noted that the first road surface model 216 and the middle line 218 are both directed to the first road surface region 214 that is closer to the own vehicle 1 than the remaining region of the road surface is. The varying feature of the remaining region of the road surface, which is on the far side of a solid horizontal line 220 illustrated in FIG. 8A, for example, still remains unknown.

One possible measure may use the varying feature of the region of the road surface on the front side of the horizontal line 220 to identify a three-dimensional object present in the region of the road surface on the far side of the horizontal line 220, on the assumption that the varying feature of the road surface region on the front side of the horizontal line 220 is continuous also in the road surface region on the far side of the horizontal line 220. For example, the measure extends the approximate straight line of the first road surface model 216 illustrated in FIG. 7B, and identifies a three-dimensional object on the basis of the road surface represented by the extended approximate straight line. Such a measure, however, may also possibly cause improper determination of a road with a gradient to be a three-dimensional object, or a failure in extracting a three-dimensional object actually present.

To address such a concern, in this example implementation, the second road surface identifier 162 may extend a starting line of the second road surface region on the horizontal line 220. For example, the second road surface identifier 162 may extend the starting line on the horizontal line 220 to a region within a range of a predetermined distance (e.g., five meters) in either side of the road surface from an intersection 222 between the horizontal line 220 and the middle line 218 derived by the first road surface identifier 160. In the three-dimensional space, the starting line may have a length greater than that of the first road surface region 214 along the horizontal direction.

There is no need for the second road surface region to include blocks obviously irrelevant to the road 200. Accordingly, when a three-dimensional object is detected on the horizontal line 220, the second road surface identifier 162 may set an end of the starting line at a side of the three-dimensional object facing the road surface. For example, the second road surface identifier 162 may search for a three-dimensional object in a five-meter distance leftward from the intersection 222 along the horizontal line 220. When any three-dimensional object, such as a wall, is not detected on the five-meter distance leftward from the intersection 222, the second road surface identifier 162 may set a left end of the starting line at a position distant leftward from the intersection 222 by five meters. When a three-dimensional object is detected on the five-meter distance leftward from the intersection 222, the second road surface identifier 162 may set the left end of the starting line at a position immediately in front of the detected three-dimensional object. Likewise, the second road surface identifier 162 may search for a three-dimensional object in a five-meter distance rightward from the intersection 222 along the horizontal line 220. When any three-dimensional object is not detected on the five-meter distance rightward from the intersection 222, the second road surface identifier 162 may set a right end of the starting line at a position distant rightward from the intersection 222 by five meters. When a three-dimensional object is detected on the five-meter distance rightward from the intersection 222, the second road surface identifier 162 may set the right end of the starting line at a position immediately in front of the detected three-dimensional object. The starting line of the second road surface region may be thereby set, which may correspond to a starting line 224 in FIG. 8B, for example. In a three-dimensional space, a horizontal length of the second road surface region may be greater than the that of the first road surface region 214.

Thereafter, the second road surface identifier 162 extracts the relative distances of blocks in a vertically upward direction from the starting line 224. For example, the second road surface identifier 162 may extract the relative distances of blocks located at the same horizontal position as any of the blocks in a region above the starting line 224. In other words, the second road surface identifier 162 may extract the relative distances of blocks in any vertical array (e.g., a cross-hatched vertical array in FIG. 8B) along the vertically upward direction away from the starting line 224. The second road surface identifier 162 may then identify, as the second road surface region, a region up to any of the blocks at which a magnitude of change in height in the three-dimensional space is equal to or greater than a predetermined threshold (i.e., at which a line indicating the heights of the extracted blocks in the three-dimensional space in a continuous fashion becomes equal to or greater than a predetermined differential value), and stop extracting the relative distances of blocks. The second road surface identifier 162 may set the block at which the magnitude of change in height in the three-dimensional space is equal to or greater than the predetermined threshold as a boundary of the second road surface region.

The second road surface identifier 162 may repeat such a process for another horizontal position while changing a horizontal position of interest, to form a group of the block arrays extending in the vertically upward direction from the starting line 224 of the second road surface region. The second road surface identifier 162 may set the group of the block arrays to be the second road surface region, which may correspond to a second road surface region 226 (e.g., a hatched region) in FIG. 8C.

Thereafter, the second road surface identifier 162 generates a second road surface model only on the basis of the group of blocks in the second road surface region 226 extracted as described above. The generation of the second road surface model according to an example implementation of the technology will now be described.

Figure 9:
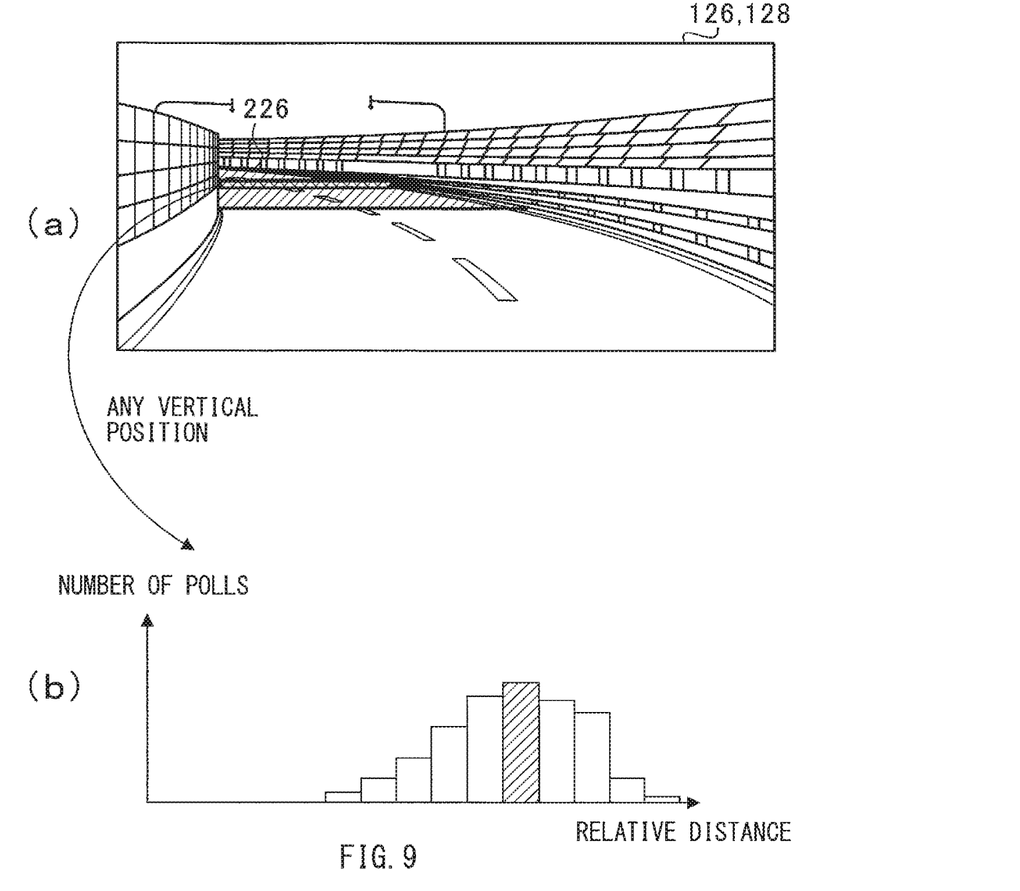
FIG. 9 is a diagram illustrating an example of a histogram.
Figure 10:
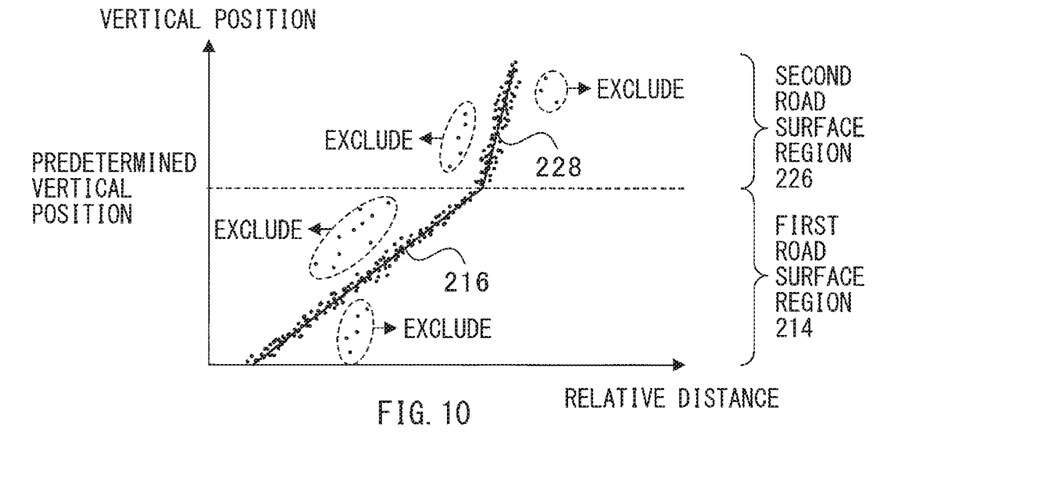
FIG. 10 is a diagram illustrating an example second road surface model.

FIG. 9 illustrates a non-limiting example of a histogram according to an example implementation of the technology, and FIG. 10 illustrates a non-limiting example of the second road surface model. First, the second road surface identifier 162 may generate a histogram of the relative distances of any horizontal array of blocks along the horizontal direction in the second road surface region 226. For example, the second road surface identifier 162 may poll the relative distances of blocks located at the same vertical position as any of the blocks in the second road surface region 226. In other words, the second road surface identifier 162 may poll the relative distances of all blocks in any horizontal array (e.g., a cross-hatched array in (a) of FIG. 9) in the second road surface region 226. On the basis of the polled relative distances, a histogram regarding any vertical position may be generated, as illustrated in (b) FIG. 9.

A hatched bar in the histogram in (b) of FIG. 9 illustrates a relative distance having a maximum number of polls. The second road surface identifier 162 may set the relative distance indicated by the hatched bar to be a representative distance of the vertical position. The second road surface identifier 162 may repeat such a process for another vertical position while changing a vertical position of interest in the second road surface region 226, to derive the representative distances of respective vertical positions in the second road surface region 226.

The second road surface identifier 162 generates the second road surface model 228 on the basis of the representative distances. For example, the second road surface model 228 may be represented by a relation between a vertical axis indicating the vertical position in the distance image 128 and a horizontal axis indicating the relative distance in the distance image 128, similarly to the first road surface model 216. In this example implementation, the second road surface identifier 162 plots, at the respective vertical positions, the representative distances of the respective vertical positions (i.e., the representative distances of the respective horizontal arrays of blocks) to generate point groups illustrated in FIG. 10. In this example implementation, the second road surface model 228 may be overlaid on the first road surface model 216 illustrated in FIG. 7B. From the point groups, the second road surface identifier 162 may generate an approximate straight line, which is illustrated by solid line in FIG. 10, by means of the least squares method, for example. The second road surface identifier 162 sets the approximate straight line to be the second road surface model 228. Similarly to the first road surface model 216, the second road surface model 228 helps to identify the varying feature, such as a gradient, of the road surface in the second road surface region 226.

As in the first road surface identifying process S200, the Hough transform, which detects a straight line in an image, may be performed in the second road surface identifying process S202. Through the Hough transform, only a point group of representative distances that form a common straight line may be remained. Optionally, a point group of representative distances that form no common straight line but form straight lines parallel to and close to each other (i.e., straight lines apparat from each other by a distance within a predetermined range) may be remained. The other point groups of representative distances (e.g., point groups each surrounded by a dashed line in FIG. 10) may be excluded as the noise representative distances. The second road surface identifier 162 may perform the least squares method only on the remaining point group of representative distances to derive an approximate straight line of the point group.

Optionally, another approximate straight line may be derived from the point group of the representative distances excluded by the Hough transform, in a case where the number of the representative distances excluded by the Hough transform is equal to or greater than a predetermined number and have continuity to each other. It is indisputable that noise representative distances may be excluded also in the generation of the other approximate straight line.

According to this example implementation, the second road surface model 228 may be derived from the second road surface region 226 that is a region expanded in the horizontal direction and including all blocks identifiable as being in the road located between the three-dimensional objects. Accordingly, it is possible to obtain the varying feature of the road surface with high accuracy, as illustrated in FIG. 10, even if the road surface is farther from the own vehicle 1.

Further, unlike the first road surface identifying process S200 that may directly generate the histogram regarding any horizontal array of blocks, the second road surface identifying process S202 may generate the histogram regarding any horizontal array of blocks after extracting the relative distances of blocks along the vertically upward direction up to any of the blocks at which the magnitude of change in height is equal to or greater than the predetermined threshold and thereby identifying the appropriate second road surface region 226. Accordingly, it is possible to further improve the accuracy in identifying the varying feature of the road surface.

In the foregoing implementations, the first road surface model 216 and the second road surface model 228 may be obtained independently from each other. In practice, however, the first road surface region 214 and the second road surface region 226 may be continuous to each other. In view of such continuity, the second road surface model 228 of the second road surface region 226 may be generated in a form continuous to the first road surface model 216 of the first road surface region 214.

[Horizontal Gradient Identifying Process S204]

The first road surface model 216 and the second road surface model 228 generated through the processes described above help to identify the gradients extending in the vertical direction (hereinafter also referred to as "vertical gradient") with high accuracy; however, a gradient extending in the horizontal direction (hereinafter also referred to as "horizontal gradient") of the road 200 is difficult to be identified with the first and second road surface models 216 and 228. In other words, the first and second road surface models 216 and 228 are generated on an assumption that the road 200 is uniform along the horizontal direction. The presence of a gradient extending in the horizontal direction of the road 200 may possibly cause improper recognition of a raised road surface as a three-dimensional object, or a failure in detecting a low-profile three-dimensional object.

To address such a concern, in an example implementation of the technology, the horizontal gradient identifier 164 may identify a horizontal gradient on the basis of the relative distances of blocks in each horizontal array in the first road surface region 214 and the second road surface region 226.

Figure 11:
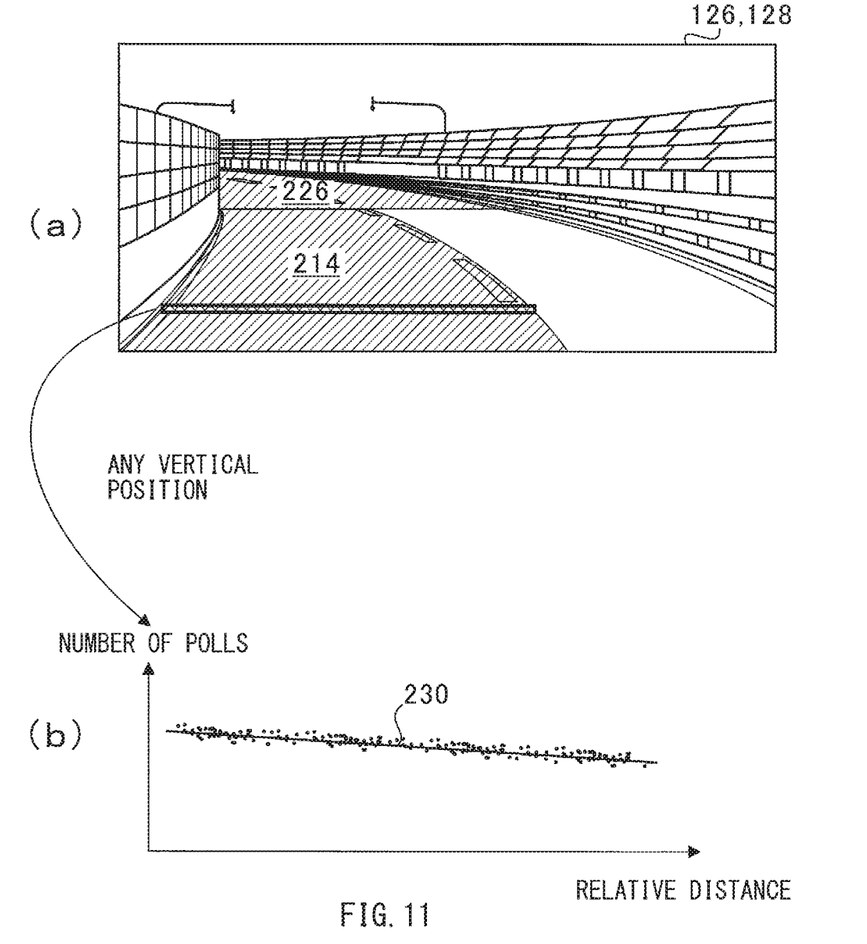
FIG. 11 is a diagram for illustrating an example of a horizontal gradient.

FIG. 11 is a diagram for illustrating a non-limiting example of the horizontal gradient. The horizontal gradient identifier 164 may extract the relative distances of all blocks located at the same vertical position as any of the blocks in the first road surface region 214 and the second road surface region 226. In other words, the horizontal gradient identifier 164 may extract the relative distances of all blocks in any horizontal array (e.g., a cross-hatched horizontal array in (a) of FIG. 11) in the first road surface region 214 and the second road surface region 226.

The horizontal gradient identifier 164 may plot the extracted relative distances at respective horizontal positions to obtain a point group illustrated in (b) of FIG. 11. From the point group, the horizontal gradient identifier 164 may generate an approximate straight line, which is illustrated by a solid line in (b) of FIG. 11, by means of the least squares method, for example. The horizontal gradient identifier 164 may identifies the approximate straight line as the horizontal gradient 230. Such identification of the horizontal gradient 230 helps to identify the varying feature (e.g., gradient) of the road surface. In this example implementation, the horizontal gradient 230 may be derived in the form of the approximate straight line for the purpose of illustration; however, the horizontal gradient 230 may be derived in the form of a multi-dimensional approximated curve, in an alternative implementation of the technology.

Optionally, the horizontal gradient identifier 164 may generate a road surface distance map of the horizontal and vertical gradients by identifying the horizontal gradients 230 for each vertical position in the first road surface model 216 and the second road surface model 228.

[Three-Dimensional Object Identifying Process S206]

The three-dimensional object identifier 166 may identify a three-dimensional object having a height extending vertically upward from the road surface on the basis of the first road surface model 216 and the second road surface model 228, or the road surface distance map including the horizontal gradients 230 in addition to the vertical gradients.

Figure 12:
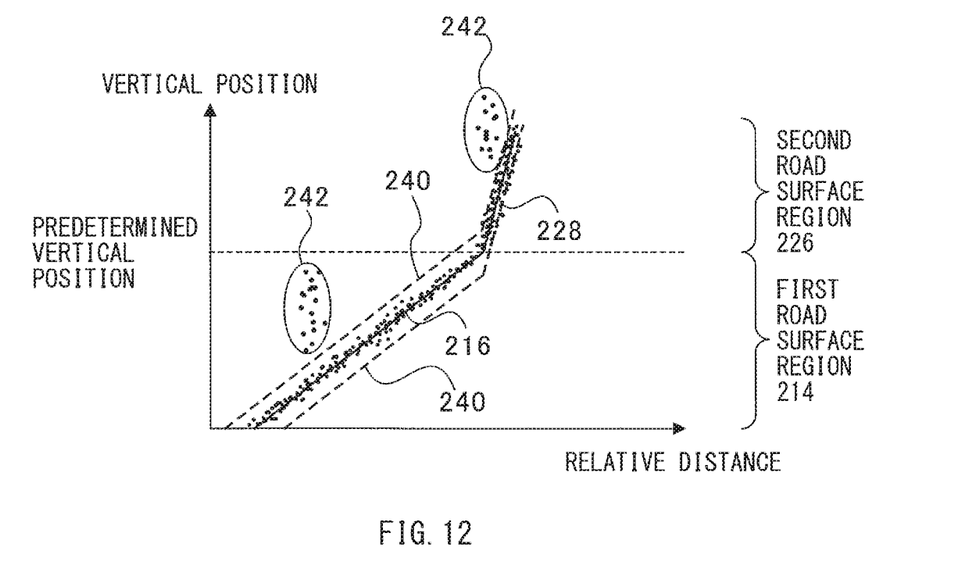
FIG. 12 is a diagram for illustrating an example process of identifying a three-dimensional object performed by a three-dimensional object identifier.

FIG. 12 is a diagram for illustrating a non-limiting example process of identifying a three-dimensional object performed by the three-dimensional object identifier 166. In FIG. 12, the first road surface model 216 of the first road surface region 214 and the second road surface model 228 of the second road surface region 226 at any timing are each represented in the form of a straight line, and the blocks extending over the entire image and associated with the respective relative distances are plotted at the respective relative distances and the respective vertical positions.

The three-dimensional object identifier 166 may compare the relative distance of each of the blocks with the first road surface model 216 and the second road surface model 228 to determine whether the block corresponds to part of a three-dimensional object. For example, the three-dimensional object identifier 166 may determine a block located within a road surface region 240 to correspond to part of the road surface. The road surface region 240 may be a region defined between an upper limit and a lower limit that are respectively indicated by dashed lines in FIG. 12. The upper limit may be higher than the first road surface model 216 and the second road surface model 228 by a predetermined distance (e.g., about 30 cm), and the lower limit may be lower than the first road surface model 216 and the second road surface model 228 by a predetermined distance (e.g., about 30 cm).

On the other hand, the three-dimensional object identifier 166 may determine a block located outside the road surface region 240 and above the upper limit to be a candidate part of a three-dimensional object, because the block protrudes upward from the road surface. The three-dimensional object identifier 166 may then perform grouping of the blocks that are determined to be the candidate parts of a three-dimensional object having a height extending vertically upward from the road surface. For example, the three-dimensional object identifier 166 may perform grouping of the blocks that are equal to each other in the relative distance into one group 242, which is surrounded by an oval in FIG. 12. The three-dimensional object identifier 166 may identify the group 242 to be a three-dimensional object. There are various currently-available technologies that determine three-dimensionality (e.g., shape, size, etc.) of the point group identified as a three-dimensional object and that determine which part of the three-dimensional object the point group belongs to; therefore, the description of the technologies is not described in detail herein.

As described above, it is possible to properly identify a three-dimensional object having a height extending vertically upward from the road surface by properly identifying the road surface.

According to any implementation of the technology, a program also may be provided that causes a computer to serve as the vehicle exterior environment recognition apparatus 120, and a computer-readable recording medium that stores the program. Non-limiting examples of the recording medium may include a flexible disk, a magneto-optical disk, ROM, CD, DVD (Registered Trademark), and BD (Registered Trademark). As used herein, the term "program" may refer to a data processor that is written in any language and any description method.

The central controller 154 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 154 illustrated in FIG. 3.

A part or all of the processes in the vehicle exterior environment recognition procedure as disclosed herein does not necessarily have to be processed on a time-series basis in the order described in the example flowchart. A part or all of the processes in the vehicle exterior environment recognition procedure may involve parallel processing or processing based on subroutine.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle exterior environment recognition apparatus that recognizes an environment outside a vehicle, the apparatus comprising:
   a first road surface identifier configured to identify a first road surface region of a road surface in an image, and generate a first road surface model by plotting, at respective vertical positions, representative distances of horizontal arrays of blocks in the first road surface region; and
   a second road surface identifier configured to identify a second road surface region in the image, and generate a second road surface model by plotting, at respective vertical positions, representative distances of horizontal arrays of blocks in the second road surface region, the second road surface region being a region of the road surface that is farther from the vehicle than the first road surface region is and having a horizontal length greater than a horizontal length of the first road surface region in a three-dimensional space,
   wherein the second road surface identifier extracts relative distances of blocks along a vertically upward direction of the image, each of the blocks including a plurality of pixels, and
   wherein the second road surface identifier identifies a region up to any of the blocks at which a magnitude of change in height in the three-dimensional space captured in the image is equal to or greater than a predetermined threshold, as the second road surface region.

2. The vehicle exterior environment recognition apparatus according to claim 1, further comprising
   a horizontal gradient identifier configured to identify a horizontal gradient on a basis of relative distances of blocks in respective horizontal arrays in the first road surface region and the second road surface region.

3. A vehicle exterior environment recognition apparatus that recognizes an environment outside a vehicle, the apparatus comprising:
   circuitry configured to
      identify a first road surface region of a road surface in an image, and generate a first road surface model by plotting, at respective vertical positions, representative distances of horizontal arrays of blocks in the first road surface region, and
      identify a second road surface region in the image, and generate a second road surface model by plotting, at respective vertical positions, representative distances of horizontal arrays of blocks in the second road surface region, the second road surface region being a region of the road surface that is farther from the vehicle than the first road surface region is and having a horizontal length greater than a horizontal length of the first road surface region in a three-dimensional space,
   wherein the identifying a second road surface region in the image includes:
      extracting relative distances of blocks along a vertically upward direction of the image, each of the blocks including a plurality of pixels; and identifying, as the second road surface region, a region up to any of the blocks at which a magnitude of change in height in the three-dimensional space captured in the image is equal to or greater than a predetermined threshold.

* * * * *